Patented June 17, 1952

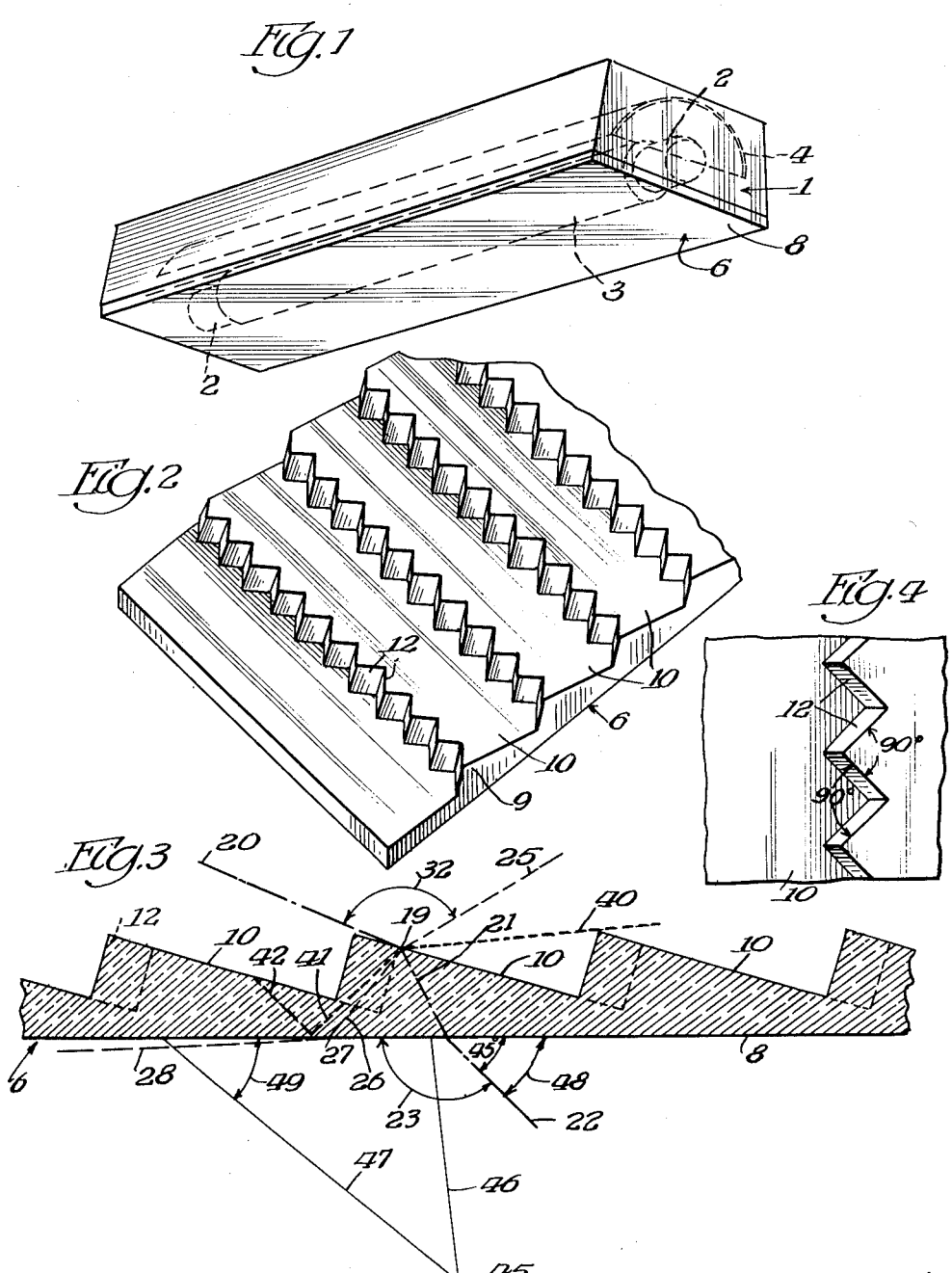

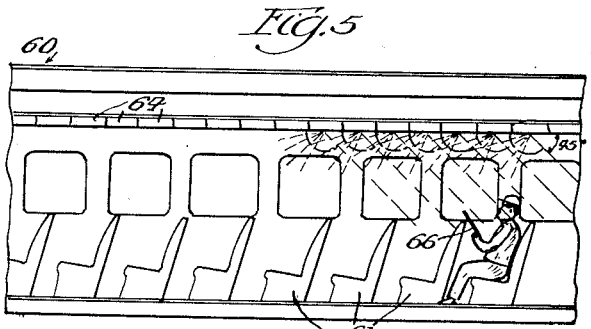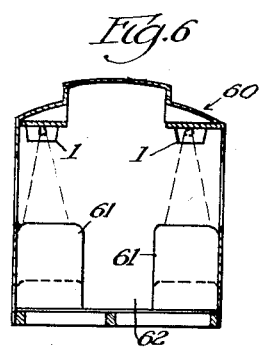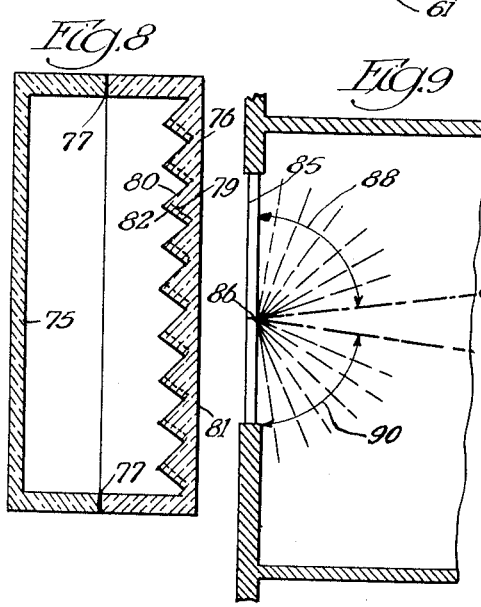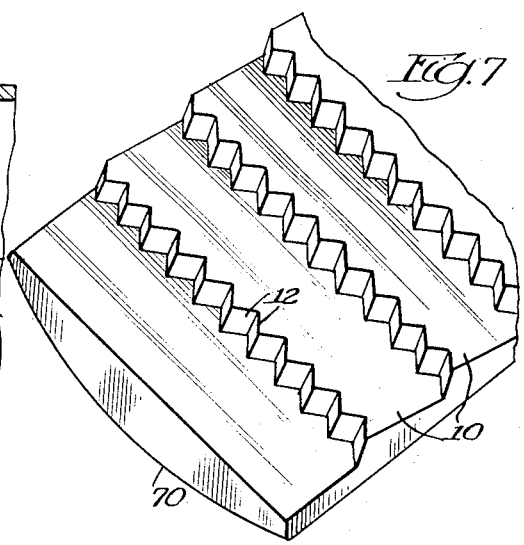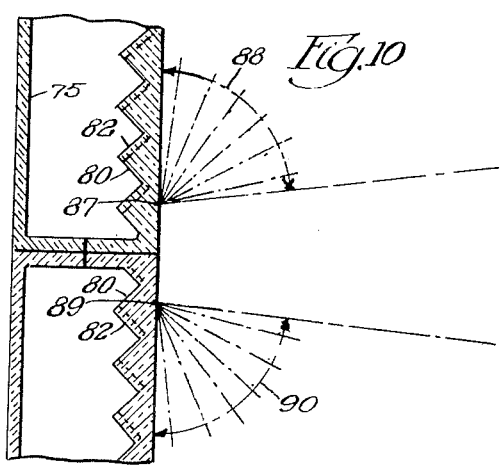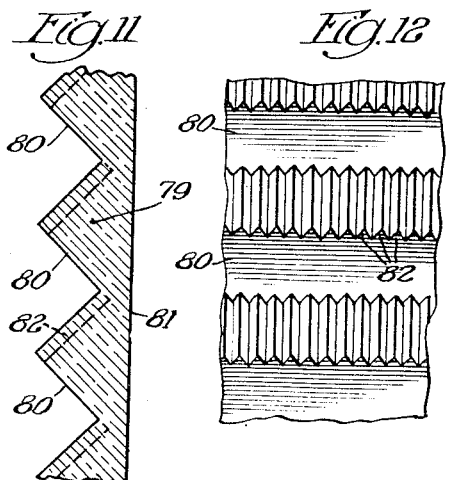

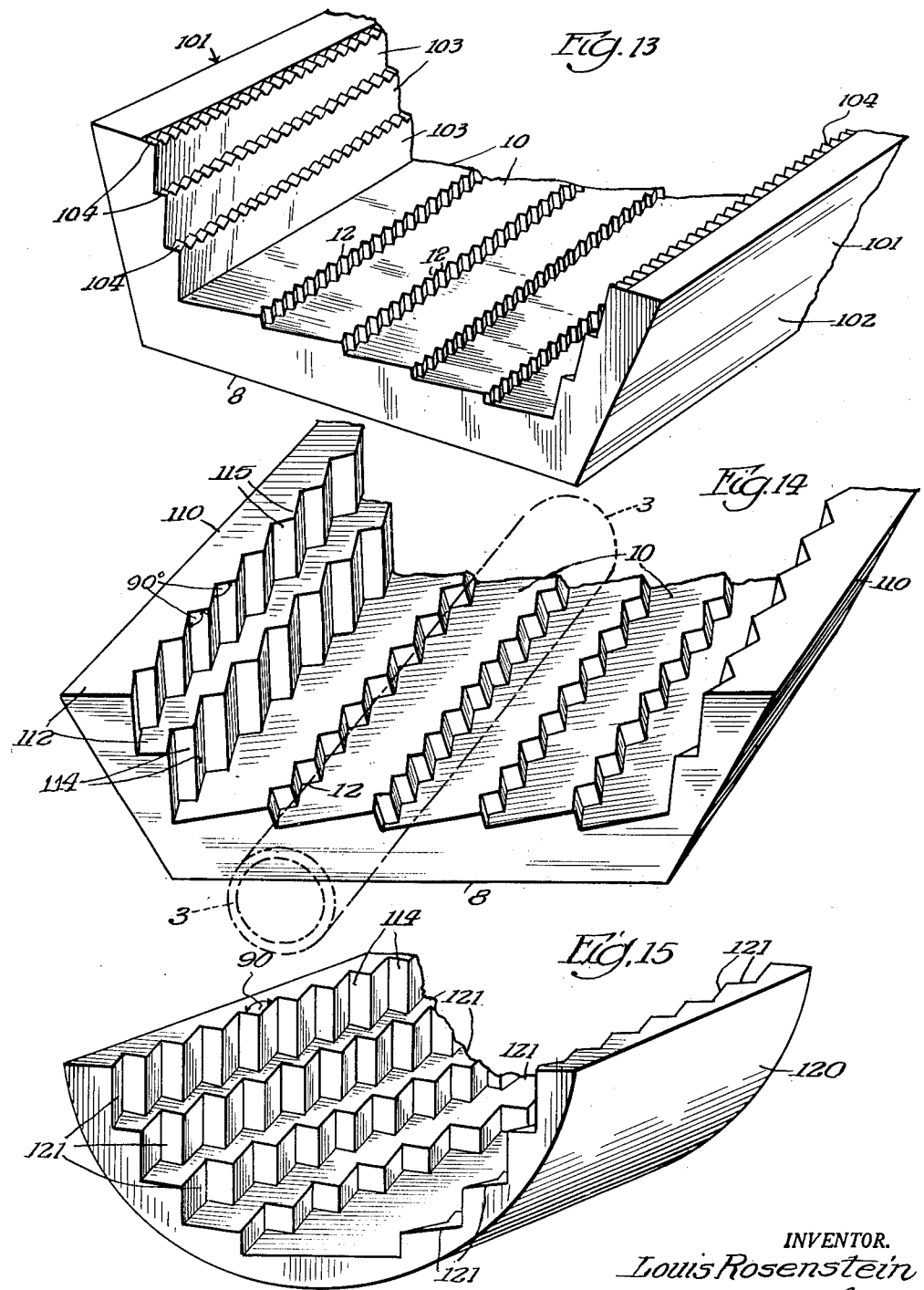

2,601,127

UNITED STATES PATENT OFFICE 2,601,127

LIGHT CONTROL MEMBER

Louis Rosenstein, Chicago, Ill.

Application July 2, 1945, Serial No. 602,905

4 Claims. (Cl. 240—7.35)

This invention relates to light control means and, more particularly, to lens means having a controlled angle of light emission to avoid glare.

It is one of the objects of the present invention to provide lighting means for structures such as vehicles including buses, railway cars and the like, and for general room illumination, either artificially or naturally, wherein the direction of the light rays is so controlled that a person occupying definite positions will receive light in the proper direction for adequate general illumination and reading, but will not be subject to glare.

Consider, by way of example, a railway passenger car or an automobile bus. Lighting fixtures are provided extending lengthwise of the vehicle and above the heads of the passengers. These lighting fixtures must direct light downwardly to provide illumination adequate for the usual purposes, including reading or the like. Frequently the lighting units are such that when a person raises his eyes slightly above the horizontal and views the lighting fixtures that are appreciably forward of the person, the light from those fixtures produces an appreciable glare. It is an object of the present invention to provide lenses for so controlling the light from the fixtures that the light is directed downwardly and forwardly through an appreciable angle but is directed rearwardly through a very slight angle or not at all. Therefore, the lighting units immediately above the passenger and those rearward of the passenger will provide illumination for reading or similar purposes, but those light units appreciably forward of the passenger will not direct a sufficient amount of light rearwardly to produce glare.

The present invention may be applied to lighting fixtures intended for use in a wide variety of places where glare control is desired. It may be used for general room illumination, or for the general interior illumination of vehicles as above set forth, or for special lighting in vehicles as, for instance, for lighting seats, beds, berths, aisles, passageways, steps, floors, tables and the like.

The present invention is also applicable for controlling glare of natural light entering a room through a window. To that effect the prism arrangement for directing the light may be incorporated in glass, such as hollow glass bricks, that is used for the windows of buildings. The glass brick which is used for that portion of the window above the eye level may be constructed to direct its light upwardly so that no light rays extend downwardly from the upper half of the window. In a like manner, by reversing the bricks used for the lower half of the window, or for the portion of the window below the normal eye level, all of the rays of light emitted from that portion of the window will be directed downwardly.

The attainment of the above and further objects of the present invention will be apparent from the following specification taken in conjunction with the accompanying drawings forming a part thereof.

In the drawings:

Figure 1 is a diagrammatic view of a lighting fixture embodying a lens of the present invention;

Figure 2 is a fragmentary perspective view showing the top of the lens of the fixture of Figure 1;

Figure 3 is a longitudinal sectional view through a portion of the lens of Figure 2;

Figure 4 is a top view of a portion of the lens of Figure 3;

Figure 5 is a diagrammatic longitudinal view through a portion of a vehicle which is illuminated by fixtures embodying the present invention;

Figure 6 is a transverse sectional view of Figure 5;

Figure 7 is a view corresponding to Figure 2 and illustrating a modified lens construction;

Figure 8 is a transverse sectional view through a hollow sealed glass brick which may be used for house windows of the non-movable type;

Figure 9 is a diagrammatic sectional view through the end of a room, including a window, embodying the present invention;

Figure 10 is an enlarged sectional view through two adjacent hollow bricks of the window of Figure 9, the meeting point of the two bricks being at the eye level;

Figure 11 is an enlarged sectional view of a portion of the brick of Figure 8;

Figure 12 is a face view of the prismatic surfaces of the section of Figure 11; and Figures 13, 14 and 15 are diagrammatic isometric views of fragmentary portions of lighting fixtures of different constructions and embodying the principles of the present invention.

Reference may now be had more particularly to the drawings wherein like reference numerals designate like parts throughout. In Figure 1 of the drawings there is shown a fluorescent type lighting fixture 1 employing a lens or light control member embodying the present invention. Except for the lens, this fixture may be of any standard conventional type employing fluorescent lighting tubes. For the purpose of illustration I have herein shown a fixture of the shape of an inverted box or trough. The fixture contains a pair of sockets 2—2, of the type adapted to receive a fluorescent glow discharge tube 3 of the hot cathode type between them, although it is to be understood that the tube 3 may be a cold cathode glow discharge light-emitting tube. The sockets 2—2 mechanically support the tube and establish electric circuit connections thereto, said sockets being mounted in the fixture in any desired manner. The length of the glow discharge tube 3 is very great in relation to its diameter. A usual type of reflector 4 is mounted above the tube 3 and extends lengthwise of the tube for the full length thereof. Underlying the tube 3 and extending the full length of the tube is a lens 6. The fixture is adapted to be mounted on the ceiling with the longitudinal axis of the glow discharge light-emitting tube 3 extending horizontally and with the bottom surface 8 of the lens 6 lying in a horizontal plane, although, of course, the unit may be mounted at an angle if desired.

The lens 6 is of an oblong or rectangular shape and preferably slightly longer than the length of the tube 3, and of a width substantially less than its length. The lens is made of any desired light transmitting medium. It may be made of glass or it may be made of known plastics such as, for instance, the plastic "Lucite." The bottom surface of the lens 6 is a flat planar surface. The top surface of the lens consists of a series of prisms 9 which are an integral part of the rest of the lens and extend crosswise of the lens. These prisms afford a series of spaced parallel planes 10 which are at an angle to the flat bottom surface 8. At its uppermost edge each prism 9 terminates in a series of serrations 12—12. Each of these serrations is a flat planar surface at right angles to the surface 10 and with adjacent flat surfaces 12—12 making an angle of 90° with one another. The surfaces 10 of the prisms 9 are in this instance at an angle of approximately 16° with respect to the surface 8. This is the desired angle in one particular construction where the herein designated magnitude of protection angle is desired. The protection angle in this instance is approximately 45°, although with other angles of the surfaces 10 other protection angles are obtained as will be more fully set forth as this description proceeds.

An explanation will now be given of the action of the lens 6, for which reference may be had to Figure 3. Assume that a ray of light 20 from a glow discharge device 3 strikes the surface 10 at an infinitesimally small angle to that surface and from the direction indicated. It enters the prism 9 at the surface 10, being bent by the prism so that the ray of light travels through the prism along the line 21, the angle of bend being in this instance maximum because the ray of entering light is assumed to be almost parallel to the entering surface 10. When the ray of light 21 leaves the surface 8 it is bent so that it now travels along the line 22. This ray of light makes an angle of approximately 45° with the surface 8, the magnitude of the angle being determined by the index of refraction of the material and by the angularity of the surface 10 with respect to the surface 8. It has been found that an angle of approximately 16° between the surface 10 and the surface 8 causes the ray 22 to emerge from the surface 8 at an angle of 45° to that surface, as above set forth, in a material of the index of refraction used.

Assume now that another ray of light, indicated by the line 25, also coming from the glow discharge device, strikes the surface 10 at the angle indicated. This ray of light entering the surface 10 is bent to follow the path indicated by the line 26 and it emerges from the lens at the point 27 and travels along the line 28, which line 28 makes an infinitesimally small angle with the surface 8. The angle between the line 26 and the surface 8 is chosen as an infinitesimally small amount in excess of the critical angle at which internal reflection takes place and the angle of the line 25 is chosen to give that requisite angularity to the line 26. Rays of light striking the point 19 of the surface 10 at any angle within the arc 32 will emerge from the surface 8 at some angle to the surface between the angle which the line 28 makes with that surface and the angle which the line 22 makes with that surface. These two lines are at approximately 135° to one another. Therefore, any ray striking the point 19 of the surface 10 at an angle thereto represented within the confines of the arc 32 will emerge from the surface 8 at an angle thereto anywhere from zero to 135° as measured in a clockwise direction from the emerging ray to the surface 8.

An explanation will now be given as to what happens to a ray of light which strikes a given point 19 on the surface 10 at an angle to the surface greater than that represented by the arc 32 when measured from the entering ray to the surface 10 in a counter-clockwise direction. Such a ray is indicated by the line 40. This ray enters the surface 10 at the point 19 and is bent upon entering that surface so that its path of passage through the medium is indicated by the line 41. The line 41 necessarily makes a lesser angle with the surface 8 than does the line 25 previously described. Since the line 26 is presumed to make just an infinitesimally greater angle than the critical angle with the surface 8, it follows that the line 41 makes an angle with the surface 8 less than the critical angle and therefore the ray 41 will not penetrate the surface 8 but will be internally reflected, as indicated by the line 42. It is thus apparent that all rays striking the point 19 of the surface 10 will either be internally reflected so as not to penetrate the surface 8 or will penetrate the surface 8 only at an angle of approximately 135° or less when measured from the emerging ray to the surface 8 in a clockwise direction. It is also apparent, therefore, that if an observer at the point 45 views the surface 8 along the line of sight indicated by the line 46, which makes an angle with the surface 8 greater than the angle 48, he will see light through the surface 8, whereas if the observer views the surface 8 along the line of sight indicated by the line 47, which makes an angle 49 with the surface 8, which is less than the angle indicated by the arc 48, then the observer will not see the light from the source 3 through the lens, because no light from the source can emerge from the surface 8 at an angle 49 which is less than the angle indicated by the arc 48. The prismatic surfaces 12—12, being at right angles to one another, prevent internally reflected light which strikes those surfaces from emerging through the surface 8 at a glare producing angle. Also any light from the source 3 which strikes the surfaces 12 will be small in quantity and also will be properly internally bent to avoid any appreciable glare.

The present invention is not limited to the use of fluorescent lighting tubes as the source of light. For instance, the light source 3 may be replaced by a plurality of incandescent light bulbs.

An explanation will now be given of one adaptation of the lighting fixture of the present invention to a vehicle, for which reference may be had to Figures 5 and 6. In these figures there is indicated at 60 a standard type of vehicle, such as, for instance, a railway coach, a street car, an automobile bus or airplane cabin. The vehicle has two rows of seats, indicated at 61—61, all of which face forward, with an aisle 62 between them, said aisle extending along the center of the vehicle lengthwise thereof. A row of lighting units 64 are mounted on the vehicle above each row of seats. Each lighting unit is of the type illustrated in Figure 1 and includes a glow discharge tube which extends lengthwise of the vehicle and a lens which extends lengthwise of the vehicle. The units are mounted in two rows, one above each row of seats, and may comprise individual spaced apart units one above each seat, or may comprise individual units adjacent one another to constitute one continuous row extending lengthwise of the vehicle. The lens of each reflector unit is of the type illustrated in Figure 2 and it extends lengthwise of the vehicle with the flat surface of the lens at the bottom thereof and in a horizontal plane. Each lighting unit transmits its light downwardly through an angular range extending from 45° to the vertical rearwardly of the vehicle to substantially a horizontal direction forward of the vehicle. Thus there is adequate lighting falling upon the newspaper or other reading material in the hands of a passenger, since such a newspaper, indicated at 66, is illuminated from the unit directly overhead and those units behind the passenger, but is not illuminated by any of the lighting units in front of the passenger except the first one immediately in front of the passenger. If the passenger directs his line of sight looking forward of the vehicle and upwardly at an angle of 45° or less to the horizontal, his line of sight to the lighting units at the forward end of the vehicle will make an angle less than 45° with the bottom surface of the lighting units and therefore his line of sight will not coincide with a line of light emitted from the unit, and therefore he will receive no glare. It is only when a forward facing passenger views a light fixture by a line of sight at an angle which is greater than 45° to the horizontal that his line of sight will coincide with a line of light emission from the unit, and hence his eye will receive light emitted from the unit. As a result it is apparent that the passenger is not subjected to glare from the lighting unit.

If the angle of the surface 10 is made greater than 16° with the surface 8 then the protection angle is increased. For instance, if the angle of the surface 10 is made exactly 45° to the surface 8 then the arc corresponding to the arc 23 of Figure 3 will extend from the surface 8 for only 90°, and the line 22 will emerge from the surface 8 at approximately 90°. In such a lens a forward looking passenger could raise his line of sight almost to the vertical before rays of light emitted from the lens will strike his eye. Such a lens affords a protection angle of substantially 90°.

As stated above, when the surface 10 makes an angle of 16° with the surface 8 the protection arc, indicated at 48, is approximately 45°. If the angle of the surface 10 is reduced in magnitude then the angle represented by the arc 48 likewise is reduced in magnitude. For instance, if the angle of the surface 10 with the surface 8 is made 10° instead of 16°, then the protection arc 48 will be at an angle of 39°. If the angle of the surface 10 with respect to the surface 8 is made 5°, then the protection angle represented by the arc 48 will be 28°.

While I have spoken of the bottom surface 8 of the lens as being a flat planar surface, it is within the purview of the present invention to make that surface of any of the shapes used in lighting fixture lenses, for instance, curved, as indicated by the arc 70 of Figure 7. This figure shows a lens corresponding to the lens of Figure 2, the top surface of which is of a construction identical with that of Figure 2 and the bottom of which instead of being planar is curved along the arc 70 of a circle so that the bottom surface 70 is a segment of a cylinder whose longitudinal axis is parallel with the longitudinal axis of the light tube 3. This affords additional control of the spread of the light in a direction transversely of the vehicle when the unit is mounted in the manner illustrated in Figures 5 and 6.

From the above description it is apparent that the protection angle is determined by the angularity of the surface 10 with the surface 8, that either of the surfaces may be stepped, and that the surface 8 may be curved in any desired manner correlated with the slope of the surface 10. It is further to be pointed out that the 90° prisms represented by the planar surfaces 12 may be of any size desired, since it is the angularity of the surfaces 12—12, rather than their extent, that determines the optical characteristics of the lens.

The lighting unit of the present invention may be installed in a stationary structure as well as in a vehicle. It lends itself particularly to installation in auditoriums and assembly halls, also in homes and offices particularly where protection against glare by an observer in a predetermined known position is desired.

The principles of light control, in accordance with the present invention, may be embodied in other structures, for instance, glass bricks for windows. In Figure 8 I have shown a hollow glass brick of a conventional construction in which my present invention has been applied. This hollow glass brick comprises, as is usual, two rectangular box-like pieces of pressed glass, indicated at 75 and 76, which are sealed together at 77 to form a hollow sealed glass brick, as is usual in the pressed glass brick art. The inner surface of the brick 76 has a number of prisms 79 formed thereon forming a plurality of parallel planar surfaces 80 which are at 45° to the outer surface 81, and with successive planar surfaces 80 joined together by a pair of planar surfaces 82 at right angles to one another and at right angles to the surfaces 80. These bricks are shown in Figure 9 as built into a wall to form a window of a room. In Figure 9 the window is indicated by the reference numeral 85, the point 86 of the window being at the eye level of a person in the room. The bricks are laid so that in those bricks below the point 86 the prismatic surfaces 82 face downwardly, whereas in those bricks above the eye level point 86 the bricks are reversed so that the prismatic surfaces 82 face upwardly, as illustrated in Figure 10. Light emerging from any point 87 on the inner surface of a brick above the eye level will emerge in the form of rays of light directed upwardly in all directions within the angular range indicated by the arc 88. Light emitted from any point 89 below the eye level point 86 will be bent downwardly and will be confined within the range indicated by the arc 90. It is thus apparent that all light entering the window above the eye level will be directed towards the ceiling and will illuminate the room by indirect illumination, whereas light entering the window below the eye level will be directed downwardly and will provide direct illumination of objects near the window. A person standing up in the room and looking directly at the window will not receive any direct light because if he looks at a point of the window above the eye level his line of sight will make an angle with the window greater than the angle 88 when measured from his line of sight to the window in a counterclockwise direction. A person looking at the window will receive direct lighting therefrom only if the line of sight from the person to the window is upwardly when viewing the window below the point 86 or downwardly when viewing the portion of the window above the point 86. On the other hand, a person sitting or standing close by the window will receive direct illumination upon a book or other matter held for view below the eye level 86.

In the lighting unit of the type illustrated in Figure 1 the prismatic serrations 12 which are at right angles to one another extend in rows crosswise of the fixture. It is within the purview of the present invention to arrange the rows of serrations 12 to extend in a direction lengthwise of the fixture rather than crosswise thereof. A lens so arranged is illustrated in Figure 13. In this figure the bottom surface 8 of the lens is flat, as previously described, and the parallel inclined surfaces 10—10 extend lengthwise of the fixture. In this instance the surfaces 10 are inclined to the surface 8 the same as are the surfaces 10 in the structure of Figure 2. The prismatic surfaces 12—12 are plane surfaces at right angles to one another and at right angles to the planes of the surfaces 10, each row of prismatic serrations extending the full length of the unit.

The lens of Figure 13 is shown as provided with diverging sides 101—101 of identical construction and formed of the same material as that of the rest of the lens. The sides 101 and the bottom constitute one integral piece of pressed glass or plastic. The outer surface 102 of each of the sides is here shown as constituting a flat surface. The inner surface of each one of the sides 101 comprises a series of parallel planar sides 103 stepped from one another by a series of steps 104 consisting of serrations or flat sided prisms the sides of which are at right angles to one another. The sides 103 are planar and may make any desired angle with the planar side 102, depending upon the protection angle which it is desired to obtain, which in turn is determined by the use to which the fixture is put.

The center of the longitudinal light emitting tube is approximately at the level of the top of the sides 101—101, or even below that level. Therefore the rays of light from the light source to the surfaces 103 will not be at sharp angles to those surfaces but rather will be confined to a small angular range on both sides of the perpendicular to the surfaces 103. That being the case practically all of the light from the light source striking the surfaces 103 which emerges from the outer surface of the side 101 will be directed either horizontally or in an upwardly direction with very little of the light from the sides directed downwardly, thus affording the necessary protection against glare by a person viewing the sides of the fixture, although some of the light emerging from the sides of the fixture may be directed downwardly, but that quantity of light will be small in amount.

In Figure 14 I have shown still another construction, corresponding to that of Figure 13. In that figure the lens of the lighting unit is of an external shape substantially the same as that of Figure 13 and includes sides 110—110 of pressed glass cast or pressed integrally with the bottom of the lens. In this figure the bottom of the lens is of the same construction as in Figure 13. In this instance, however, the prismatic right angle serrations, corresponding to the serrations 104 of Figure 14, are at right angles to the serrations 104 of Figure 13. In this figure the sides 110 of the lens are stepped to provide flat surfaces 112 which may be parallel to one another and may be parallel or inclined to the surfaces 10. Between the end surface 10 and the first surface 112 there are a number of upstanding serrations in the form of plane surfaces 114—114 adjacent ones of which are planes at right angles to one another and all of which are at right angles to the plane 112. A similar set of serrations 115 at right angles to one another and at right angles to the surfaces 112 joins the top flat surface with the subjacent flat surface 112. Both rows of serrations 114—115 extend the full length of the unit.

If desired the features of Figure 13 and Figure 14 may be combined in a single lens wherein the serrations 114—115 are provided on the surfaces 103 on the lens of Figure 13 in addition to the serrations 104 there already shown.

Figure 15 shows still another cross sectional shape of a lens. The outer surface of a lens may be of the form of a segment of a tube, being a smooth curved surface extending the full length of the lighting fixture. On the interior of the surface of the lens 120 there are a plurality of rows 121 of vertically extending serrations, the serrations comprising planar surfaces at right angles to one another, each row extending the full length of the unit. The unit of Figure 15 is made of pressed glass, plastic or the like, and is adapted to embrace a light emitting tube extending lengthwise of the unit on the inside thereof.

While I have herein shown the lens of the present invention as particularly adapted for a lighting fixture wherein the light source is of the nature of a glow discharge tube or of a series of aligned incandescent light bulbs, it is within the purview of the present invention to embody the features of the invention in a lens for a light fixture employing, for instance, a single dependent incandescent light bulb, that is, applying the present invention to a lens of the bowl type which embraces an electric light bulb. In such a case the bottom of the bowl would have, on its inner side, planar inclined surfaces 10 with the serrations comprising the surfaces 12 at right angles to one another and at right angles to the surfaces 10, as illustrated in Figures 2, 13 or 14, and the walls 101—101 of Figure 13 would then be one continuous circular wall around the bottom 8 with the prisms 104 or 114 as of Figure 14, or both, provided on such circular wall which surrounds the bottom of the lamp. The light bulb would be located at the center of the bowl type lens as is the usual practice.

From my above description it is apparent that I have invented a light control member and a method of illumination which is of broad general application and which may readily be modified within the scope of the present disclosure and claims without departing from the spirit of the present invention. What is considered new and desired to be secured by Letters Patent is:

1. In a lighting unit, a longitudinally extending light source, a light transmitting lens extending lengthwise of the light source and having a bottom and sides together substantially embracing the light source for the full length thereof, prismatic surfaces arranged along the sides of the lens on the interior thereof and at such angles as to direct upwardly substantially all of the light from the source which is transmitted through the sides, and means on the bottom of the lens for directing light from the source predominantly in one direction with respect to a normal to the center of the bottom of the lens, said last named means being on the inner surface of the lens bottom and comprising surfaces inclined to the outer surface of the lens bottom by more than 10° and less than 20°.

2. In a lighting unit, a longitudinally extending light source, a light transmitting lens extending lengthwise of the light source and having a bottom and sides together substantially embracing the light source for the full length thereof, prismatic surfaces arranged along the sides of the lens on the interior thereof and at such angles as to direct upwardly substantially all of the light from the source which is transmitted through the sides and means on the bottom of the lens for directing light from the source predominantly in one direction with respect to a normal to the center of the bottom of the lens, said last named means comprising prisms on the bottom of the lens, one longitudinal edge of each of said prisms being serrated, the serrations comprising successive planar surfaces at right angles to one another.

3. A light transmitting lens comprising a light permeable body one side of which is flat and the other side of which comprises a series of planar parallel surfaces lying in spaced apart planes inclined to said flat side, a series of steps connecting said inclined surfaces, each step comprising a series of flats at substantially 90° to one another and at an angle of the order of 90° to the planar surfaces, the angle of inclination of the planar parallel surfaces with respect to the flat side being in excess of 10° and substantially less than 45°.

4. An electric lighting fixture comprising a pair of spaced glow discharge tube receiving sockets adapted to receive a light emitting tube between them, a light transmitting lens spaced from and extending lengthwise of a light emitting tube that may be placed in the sockets, said lens comprising a light permeable body one side of which is flat and the other side of which comprises a series of spaced parallel planar surfaces inclined to said flat side and in planes spaced from one another, there being a series of steps connecting said inclined surfaces, the respective steps being at angles of the order of 90° to the planes of the inclined surfaces, and each of said steps comprising a series of planes at substantially 90° to one another, the angle of the inclination of the parallel inclined surfaces with respect to the flat side being of the order of 16°.

LOUIS ROSENSTEIN.

REFERENCES CITED

The following references are of record in the file of this patent:

UNITED STATES PATENTS

| Number | Name | Date |
|---|---|---|
| 458,850 | Jacobs | Sept. 1, 1891 |
| 755,197 | Wadsworth | Mar. 22, 1904 |
| 1,791,936 | Rolph | Feb. 10, 1931 |
| 1,886,445 | Delano | Nov. 8, 1932 |
| 2,015,235 | Rolph | Sept. 24, 1935 |
| 2,142,964 | Godley | Jan. 3, 1939 |
| 2,269,554 | Rolph | Jan. 13, 1942 |
| 2,337,794 | Arenberg | Dec. 28, 1943 |
| 2,352,804 | Schepmoes | July 4, 1944 |
| 2,372,874 | Zimmerman | Apr. 3, 1945 |
| 2,434,049 | Nordquist | Jan. 6, 1948 |

FOREIGN PATENTS

| Number | Country | Date |
|---|---|---|
| 408,366 | England | Apr. 12, 1934 |